UNITED STATES PATENT OFFICE.

JOHN D. RILEY AND JOHN L. LOVELL, OF CONNEAUT, OHIO.

PLASTIC PACKING COMPOSITION.

1,270,056. Specification of Letters Patent. Patented June 18, 1918.

No Drawing. Application filed March 19, 1917. Serial No. 155,835.

*To all whom it may concern:*

Be it known that we, JOHN D. RILEY and JOHN L. LOVELL, citizens of the United States, residing at Conneaut, in the county of Ashtabula, State of Ohio, have invented a new and useful Plastic Packing Composition, of which the following is a specification.

This invention relates to a composition of matter for use as a plastic packing, one of the objects of the invention being to provide a metallic packing which can be molded by hand and readily packed into a bearing.

A further object is to provide a composition of this character which will never become hard even after years of service, but can be removed at any time, remolded and replaced wherever desired and still operate efficiently as a practically frictionless packing.

Another object is to provide a packing material which can be placed in a stuffing box of any shape or size and fits perfectly therein, this being due to the plastic nature of the composition.

A still further object is to provide a plastic packing material which will not heat, scratch, or otherwise injure a rod or other member working therein.

With the foregoing and other objects in view the invention consists in combining Babbitt metal, flake graphite, asbestos fiber, cylinder oil, and beeswax, and working them together in such a manner as to produce a plastic composition about 90% of which is metal.

In making the composition, an amount of Babbitt metal is heated until it is in a liquid state, at which time flake graphite is added and the two ingredients are thoroughly stirred so that, when the mass is heated to the proper temperature, the graphite will be thoroughly mixed with the Babbitt metal. While the mixture is in a semi-molten state, it is passed through a series of screens. This causes the mixture to be divided into very small particles, each particle being impregnated with graphite and being rendered self-lubricating and practically frictionless. Cylinder oil and beeswax are next mixed together in the proportion of 95 parts of cylinder oil and 5 parts of beeswax. An amount of asbestos fiber is then thoroughly drenched with this mixture of oil and beeswax and is spread out on a movable table. The comminuted metal is then sprinkled on the asbestos fiber, after which the table with the material spread thereover is passed under a heated roll which presses the metal into the fiber. More metal is then added to the mixture, the sheet of mixed ingredients is folded upon itself and the roller again passed thereover. This rolling, addition of metal and folding is repeated until a large amount of the metal has been worked into the mass, and until practically 90% of the weight of the mass is metal.

The asbestos fiber serves to hold the particles of metal together and to give flexibility to the packing. The oil and beeswax constitutes a lubricant, the wax serving to retain the lubricating properties of the oil with which the asbestos fiber is saturated. The graphite makes the packing practically frictionless.

As has already been stated, it has been found that a packing made as described will not get hard after months or even years of service and after long use can be removed, remolded by hand and replaced in a bearing. It can be fitted perfectly in stuffing boxes of any shape or size and is practically frictionless.

The proportions of the ingredients can be varied at will.

What is claimed is:—

A plastic metallic packing composition including a mixture of Babbitt metal and flake graphite united by fusion and reduced to a finely comminuted state, to produce particles each of which contains graphite as a lubricating medium, and asbestos fiber saturated with a mixture of cylinder oil and beeswax and thoroughly commingled with said metallic particles.

In testimony that we claim the foregoing as our own, we have hereto affixed our signatures in the presence of two witnesses.

JOHN D. RILEY.
JOHN L. LOVELL.

Witnesses:
HARRIET CODY,
HELEN M. RILEY.